(12) United States Patent  (10) Patent No.: US 7,707,591 B2
Curry et al.  (45) Date of Patent: Apr. 27, 2010

(54) INTEGRATION OF AUDIO OR VIDEO PROGRAM WITH APPLICATION PROGRAM

(75) Inventors: Michael J. Curry, Jackson, CA (US); Rudy D. Martin, Morgan Hill, CA (US); Douglas Z. Pan, Milpitas, CA (US); Richard T. Simoni, Jr., Cupertino, CA (US)

(73) Assignee: Talkway, Inc., Fremont, CA (US)

( * ) Notice: Subject to any disclaimer, the term of this patent is extended or adjusted under 35 U.S.C. 154(b) by 400 days.

(21) Appl. No.: 09/683,706

(22) Filed: Feb. 5, 2002

(65) Prior Publication Data

US 2003/0149802 A1  Aug. 7, 2003

(51) Int. Cl.
*G06F 9/44* (2006.01)
*G06F 15/16* (2006.01)

(52) U.S. Cl. .................. 719/328; 719/318; 719/329; 709/206

(58) Field of Classification Search ............... 709/206, 709/310, 313, 319, 328, 246, 203; 345/752; 719/318, 328, 322, 310, 329
See application file for complete search history.

(56) References Cited

U.S. PATENT DOCUMENTS

| | | | |
|---|---|---|---|
| 5,802,314 A * | 9/1998 | Tullis et al. .................. 709/246 |
| 5,889,518 A * | 3/1999 | Poreh et al. .................. 345/804 |
| 6,014,688 A | 1/2000 | Venkatraman et al. |
| 6,014,689 A | 1/2000 | Budge et al. |
| 6,124,939 A * | 9/2000 | Toyoda et al. ............... 358/1.15 |
| 6,131,121 A | 10/2000 | Mattaway et al. |
| 6,145,083 A * | 11/2000 | Shaffer et al. ................ 713/201 |
| 6,185,184 B1 | 2/2001 | Mattaway et al. |
| 6,212,551 B1 | 4/2001 | Asghar et al. |
| 6,223,213 B1 | 4/2001 | Cleron et al. |
| 6,233,318 B1 | 5/2001 | Picard et al. |
| 6,252,588 B1 | 6/2001 | Dawson |
| 6,253,231 B1 | 6/2001 | Fujii |
| 6,389,467 B1 | 5/2002 | Eyal |
| 6,442,549 B1 | 8/2002 | Schneider |
| 6,460,075 B2 * | 10/2002 | Krueger et al. ............... 709/206 |
| 6,484,199 B2 | 11/2002 | Eyal |
| 6,564,248 B1 | 5/2003 | Budge et al. |
| 6,721,781 B1 * | 4/2004 | Bates et al. .................. 709/203 |

(Continued)

FOREIGN PATENT DOCUMENTS

WO  WO-02/03284  1/2002

(Continued)

OTHER PUBLICATIONS

Ouhyoung et al. "The MOS Multimedia E-Mail System" IEEE, 1994, pp. 315-324.*

(Continued)

*Primary Examiner*—Van H Nguyen
(74) *Attorney, Agent, or Firm*—Michael Dryja

(57) ABSTRACT

An application program and an audio or video program may run on an operating system. The audio or video program is integrated with the application program. A user of the application program interacts with the audio or video program as though the audio or video program were part of the application program.

6 Claims, 4 Drawing Sheets

U.S. PATENT DOCUMENTS 6,826,407 B1 * 11/2004 Helferich .................. 455/466

FOREIGN PATENT DOCUMENTS

| WO | WO-02/09437 | 1/2002 |
|---|---|---|
| WO | WO-02/44950 | 6/2002 |

OTHER PUBLICATIONS

Markovic et al. "A MS-Window Software Tool for Multimedia E-mail in Local Area Network" IEEE, 1997, pp. 101-105.*
Turner et al. "Continuous Media E-mail on the Internet: Infrastructure Inadequacies and a Sender-Side Solution" IEEE, 2000, pp. 30-37.*
Yahoo! Messenger, http://messenger.yahoo.com, copyright 2002.
Intel Email Postcard, http://www.intel.com/pccamera/software/send.htm, copyright 2002.
Kensington VideoCAMworks software, http://www.orbitnet.com/VideoCAMworks, 1999.
VideoLink Mail, http://www.smithmicro.com, copyright 2002.
IBM PC Pro Camera, http://www.ctdepot.com, undated.
VideoLink Pro, http://www.smithmicro.com, copyright 2002.
EyeBall Networks product datasheet, brochure, copyright 2001.
Click to Meet, http://www.cuseeme.com/products/clicktomeet.htm, copyright 2002.
Dwyco Video Conferencing System, http://www.dyco.com, copyright 1995-2001.
Microsoft NetMeeting, http://www.microsoft.com/windows/NetMeeting, last update Jun. 7, 1999.
Online Call, http://www.onlinecall.com, copyright 1996-2002.
VideoMail Studio, http://www.digitalmediaworks.com, undated.
Picante, http://www.picantecorp.com, Jan. 2001.
MSN Messenger, http://messenger.msn.com, copyright 2002.
Definition of Operating System, copyright 2004-2006.
Definition of Application Program, Computer Desktop Encyclopedia, version 19.1, 1st Quarter 2006.
Definition of System Software, Computer Desktop Encyclopedia, version 19.1, 1st Quarter 2006.

* cited by examiner

US 7,707,591 B2

INTEGRATION OF AUDIO OR VIDEO PROGRAM WITH APPLICATION PROGRAM

BACKGROUND OF INVENTION

This invention relates generally to an audio or video program, and more particularly to integrating the audio or video program with an application program, such as an email program or another type of program.

The popularity of small video cameras for use with personal computers has been increasing. Such video cameras are sometimes referred to as netcams or webcams. Typically, they connect to the Universal Serial Bus (USB) or other port of a computer, and enable users to record or stream video and audio into the computer. Popular applications of such cameras include small-scale video conferencing, live transfer of video onto a web site, as well as other applications.

Unfortunately, using such cameras in connection with existing application programs, such as and especially existing email programs, is difficult or inconvenient at best. A user, for instance, may wish to record live video and audio for sending to another user over email. Typically this means that the user must use a stand-alone computer program, usually supplied with the video camera, to record the video and audio, and save it as a separate file on the computer's hard disk drive. The user then must manually attach the file to an outgoing email, and hope that the recipient of the email has a computer with the capability to playback the file.

This scenario, however, presents numerous stumbling blocks. The user may not be sophisticated enough to save the recorded video and audio as a file, and may also not be sophisticated enough to manually attach the file to an outgoing email. This is especially the case with complex email programs, such as versions of Microsoft Outlook, available from Microsoft Corp., of Redmond, Wash. Even if the user can perform all this functionality, the end user still may not have a program that can playback the file, and may not know how to obtain one easily. Furthermore, at best this entire process is laborious, which itself may cause users to send video and audio with their emails far less than they otherwise would.

For these and other reasons, therefore, there is a need for the present invention.

SUMMARY OF INVENTION

The invention relates to the integration of an audio or video program with an application program. A system of the invention may include an operating system, an application program running on the operating system, and an audio or video program also running on the operating system. The audio or video program is integrated with the application program. A user of the application program interacts with the audio or video program as though the audio or video program were part of the application program.

A method of the invention may include first detecting when an event related to a predetermined application program occurs. Upon detection of the event, one or more audio or video controls are presented, for use in conjunction with the application program. Thus, an audio or video program encompassing the audio or video controls is integrated with the application program.

A computer-readable medium of the invention has instructions stored thereon for an audio or video computer program. The program includes means for detecting when an event related to a predetermined application program occurs. The program also includes means for presenting one or more audio or video controls for use in conjunction with the window of the application program. The audio or video computer program of which the controls are a part is thus integrated with the application program.

At least some embodiments of the invention provide for advantages over the prior art. Integration of an audio or video program is provided even into an existing application program, such as an email program. Audio or video is thus easily incorporated into emails, and emails having audio or video can be easily played back, even for unsophisticated users. The user preferably interacts with the audio or video program as if it were part of the application program itself, and therefore does not have to perform complicated tasks to add audio or video into the application, or playback audio or video that has already been incorporated.

Still other advantages, aspects, and embodiments of the invention will become apparent by reading the detailed description that follows, and by referring to the accompanying drawings.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview

Figure 1:
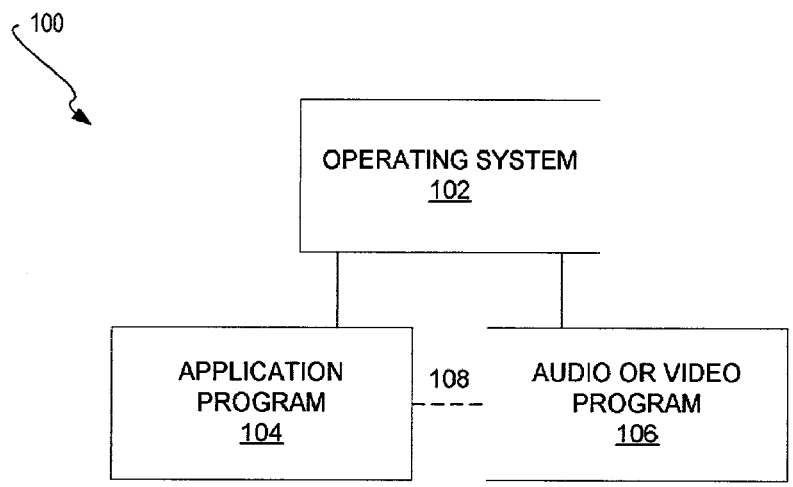
FIG. 1 is a diagram of a system according to an embodiment of the invention, in which an audio or video program running on an operating system (OS) is integrated with an application program running on the OS.

FIG. 1 shows a system 100 according to an embodiment of the invention. The system 100 may be implemented in a desktop or laptop computer, as well as other types of computerized devices. Such computerized devices may include personal digital assistant (PDA) devices, cellular and other types of wireless phones, add-on devices to displays known as set-top boxes, and so on. The system 100 includes an operating system (OS) 102, an application program 104, and an audio or video program 106. The OS 102 is the master control program that runs the computer. It is usually the first program loaded when the computer is turned on, and its main part, the "kernel," resides in memory at all times. The OS 102 typically sets the standards for all programs that run on the computer. The programs 104 and 106 communicate with the OS 102 for user interface and file management operations. Examples of the OS 102 include versions of the Microsoft Windows OS, available from Microsoft Corp., versions of the Apple Macintosh OS, available from Apple Computer, Inc., of Cupertino, Calif., versions of the Linux OS, versions of the UNIX OS, and so on.

The application program 104 can include any data entry, update, query or report program that processes data for the user. The application program 104 can include productivity software, such as communication and email programs, spreadsheet programs, word processing programs, instant messaging programs, publishing programs, database programs, telephony programs, gaming programs, presentation programs, and so on. The application program 104 is separate from and not aware of the audio or video program 106. The audio or video program 106 allows for recording and/or playback of audio, video, or audio and video. The audio or video may be streaming or non-streaming in nature, as known within the art.

The program 106 may control a video camera not shown in FIG. 1. The camera may be a web cam, a net cam, a digital video (DV) cam with a FireWire (IEEE-1394) or other interface, a Hi-8 cam with an S-video or other type of interface, and so on. The phrase "audio or video program" is inclusive of a program that processes both audio and video. That is, the phrase "audio or video program" includes audio-only programs, video-only programs, and both audio-and-video programs. The program 106 can be a player program, a recorder program, or both a player-and-recorder program for the audio or video.

The term recording as used herein is used in a general and all-encompassing sense. The term can mean store audio and/or video for playback at a later time. It can also mean the capture, and/or encoding (such as compressing), and/or transmitting of such audio and/or video. Thus, the audio and/or video might be played back immediately, or played back later. That is, the persistent storage of the audio and/or video does not have to occur to fall within the term recording as used herein. Similarly, the term playing back can include the playing back of previously stored content, as well as playing back live content.

The audio or video program 106 is integrated with the application program 104, as indicated by the dotted line 108. In one specific embodiment, the application program 104 is unaware that the audio or video program 106 has been integrated therewith. This generally and in a non-limited manner means that the application program 104 has not been developed a priori with integration of the audio or video program 106 in mind, and also does not operate with knowledge that the audio or video program 106 has been integrated therewith. Thus, the program 104 is not itself specially modified to allow integration of specifically the audio or video program 106. Furthermore, a user of the application program 104 interacts with the audio or video program 106 as though the audio or video program 106 were part of the application program 104. That is, the user may or may not be aware that the audio or video program 106 is actually external to the application program 104.

In another specific embodiment, the application program 104 is specifically unaware that the audio or video program 106 has been integrated therewith. This means that the application program 104 may be generally aware that the audio or video program 106 has been integrated therewith. That is, some application programs may have extension mechanisms, via plug-ins or other types of add-in programs, that allow for extensibility of the application programs. As such, the application programs may be generally aware that other programs may be added thereon. However, the application program 104 is still specifically unaware that the audio or video program 106 has been integrated therewith.

Furthermore, in another embodiment, the application program 104 is specifically aware that the audio or video program 106 has been integrated therewith. As an example only, the application program 104 may have a specific mechanism therein intended for the audio or video program 106. As such, once the audio or video program 106 has been integrated with the application program 104, the application program 104 is aware of the integration.

Figure 2A:
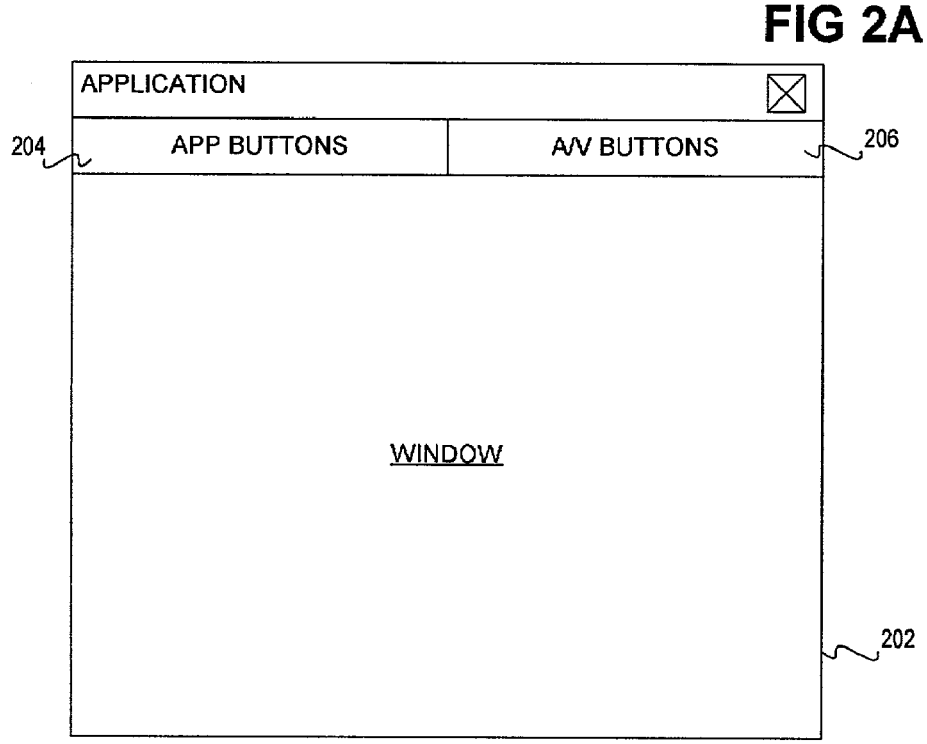
FIGS. 2A and 2B are diagrams of windows showing how different example embodiments of the invention may implement integration of an audio or video program with an application program.
Figure 2B:
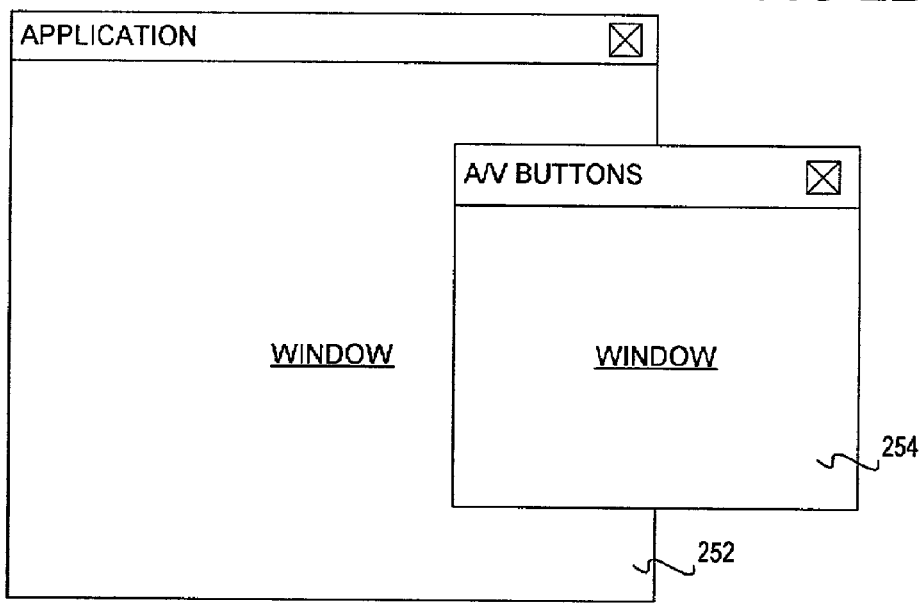

Examples of integration of the audio or video program 106 with the application program 104 are shown in FIGS. 2A and 2B. In FIG. 2A, the window 202 has been created by the application program 104 through the OS 102. The window 202 includes toolbar buttons 204 that are part of the application program 104 itself. However, the window 202 also includes toolbar buttons 206 that are added by the audio or video program 106 through the OS 102, and that relate to functionality provided by the audio or video program 106 itself. That is, the application program 104 is not aware that the audio or video program 106 has added the toolbar buttons 206 to the window 202. When the user clicks on any of the toolbar buttons 206, the resulting functionality is controlled by the audio or video program 106, and not by the application program 104.

A toolbar is generally a row or column of on-screen buttons used to activate functions. More generally a toolbar button is an example of a control that is used to activate a function. Thus, the toolbar buttons 206 of FIG. 2A are examples of audio or video controls. Other types of controls that can be audio or video controls include menu items and menus, and other user interface elements. In general, the toolbar buttons 206 of FIG. added by the audio or video program 106 to the window 202 can be considered an example of the audio or video program 106 modifying the contents of the window 202 of the application program 104.

In FIG. 2B, the window 252 has been created by the application program 104 through the OS 102, whereas the window 254 has been created by the audio or video program 106 through the OS 102. The audio-or-video window 254 is related to the application window 252 in that tasks performed in the audio-or-video window 254 relate to the application window 252 in some way. For example, audio or video recorded by the user through the window 254 may be added to the content of the window 252, such as an email, a word processing document, and so on. As another example, the content of the window 252 may include audio or video, or a reference to audio or video, that is played back in the window 254.

Figure 3:
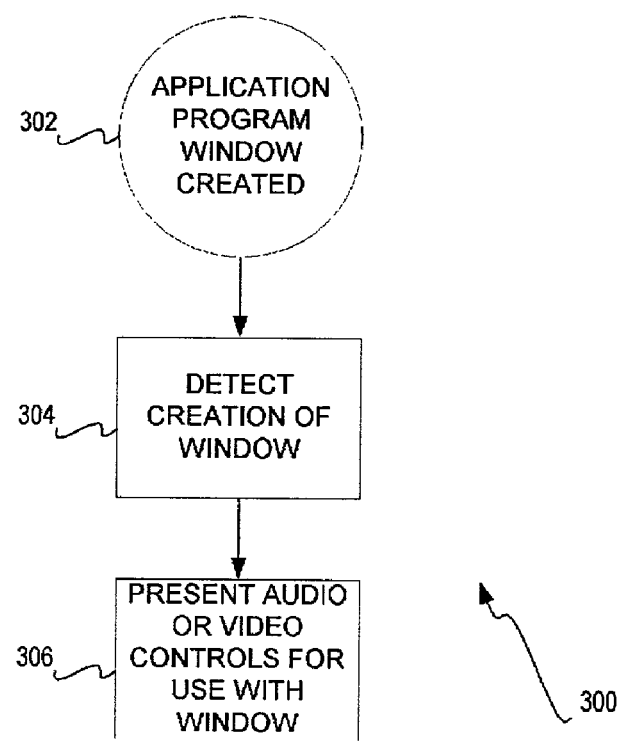
FIG. 3 is a flowchart of a method showing the overall process by which integration of an audio or video program with an application program is accomplished, according to an embodiment of the invention.

Audio or Video Program Integration with an Application Program: Introduction FIG. 3 shows a method 300 of the overall approach followed by an embodiment of the invention to integrate an audio or video program with an application program. First, the application program creates a window through the OS (302). This creation of a window is detected by the audio or video program (304), and in response one or more audio or video controls are presented for use in conjunction with this window (306). The creation of a window is one type of event that can be detected by the audio or video program such that in response to the detection, audio or video controls are presented. Other types of events include menu item selections, button clicks, the appearance of particular text strings or graphical icons, and so on. The audio or video controls may be presented as have been described in conjunction with FIGS. 2A and 2B, for instance.

Figure 4:
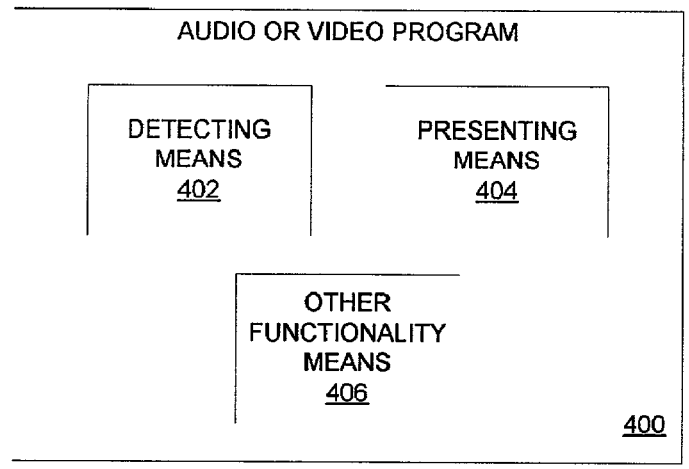
FIG. 4 is a high-level diagram of an audio or video program that can integrate itself with an application program, according to an embodiment of the invention.

FIG. 4 shows an audio or video program 400 for performing the functionality of the method 300. The program 400 includes a detecting means 402, a presenting means 404, and an other functionality means 406. Each of the means 402, 404, and 406 may be considered a separate component, module, routine, set of routines, and so on, of the program 400. The program 400 may be stored on a computer-readable medium, such as a hard disk drive, a removable storage medium such as a floppy disk or a CD-ROM, and so on. The detecting means 402 is for detecting the an event related to the application program, such as the creation of an application program window, whereas the presenting means 404 is for presenting the audio or video controls in response to the detection of the application program window being created.

The other functionality means 406 includes the actual functionality of the audio or video program. For instance, the functionality includes what occurs when the audio or video controls are selected. If a user selects a record control, for example, then the other functionality means records audio or video content. The functionality may also include functionality for modifying output of the application program into which the audio or video program 400 has been integrated. For example, in the context of an email application program, when a message is sent, this event is detected, and the body of the message may be modified to include streaming media content.

That is, the other functionality means 406 can include the actual functionality of the audio or video program that is largely independent of the application program, as well as the functionality of the audio or video program as further integrated with the application program. The audio or video program is initially integrated into the application program by presenting audio or video controls, but then subsequent integration may also occur, such as the modification of an email message in the context of an email application program, as has been described. This latter type of functionality can be considered modification of the behavior of the application program.

In one embodiment, the computer program 400 has an application programming interface (API), which may be based on JavaScript or another type of scripting programming language, or on a traditional programming language such as C or C++. This allows integration of the program 400 into a web page formatted in accordance with a mark-up language such as the HyperText Markup Language (HTML). As such, integration of the computer program 400 with an application program can be accomplished by embedding a control consistent with the mark-up language, such as an ActiveX control in the case of HTML, within the application program. The control then accesses the computer program 400 via the API of the program 400.

Audio or Video Program Integration with an Application Program: Hooking/Subclassing In one embodiment of the invention, the audio or video program integration introduced with description of and reference to FIGS. 3 and 4 is particularly accomplished through hooking or subclassing. Hooking and subclassing operate on messages within the messaging system of an OS. Subclassing specifically deals with intercepting messages bound for one or more windows, which are intercepted before they can reach their destination window. The intercepted message can be processed, and then sent to its initial destination. Similarly, hooking deals with intercepting messages, but at a broader scope than subclassing. Hooking allows the interception of messages at various points within the OS, such that a message can, for instance, be intercepted before or after a window has processed the message.

The term window, as used in this sub-section of the detailed description, can include a desktop window, a program's top-level window, any child windows to the top-level window, dialog boxes, messages boxes, and controls. That is, the term window as used in this sub-section has a broader meaning than the conventional use of the term. A window has a window procedure that can receive messages and act on them. All windows contain a default window procedure defined in a window class.

Figure 5:
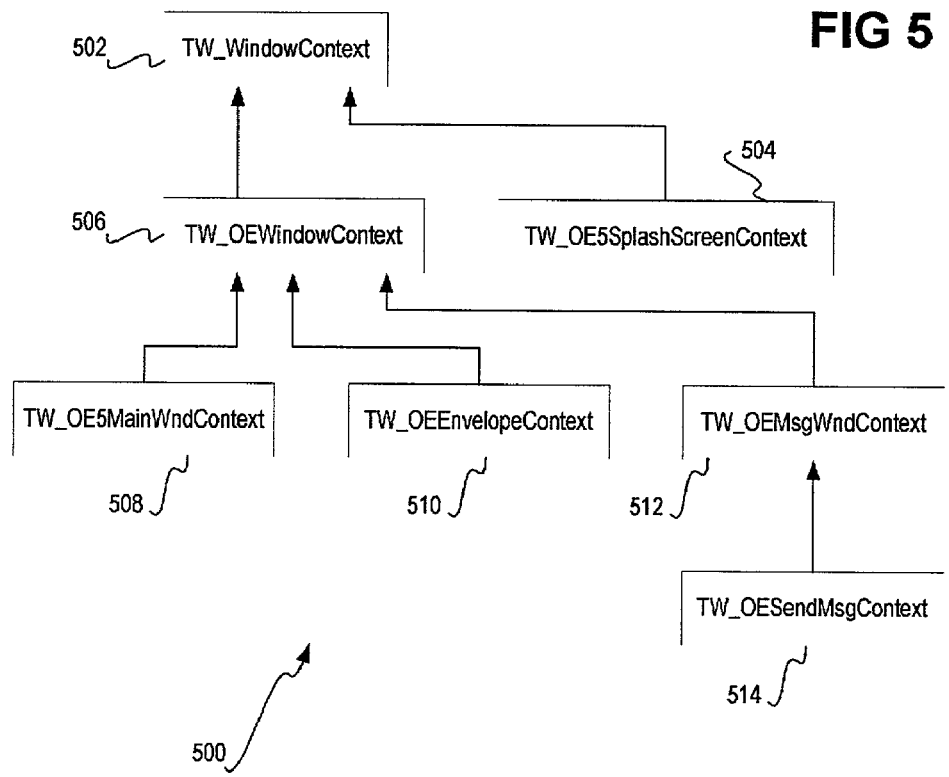
FIG. 5 is a diagram of the hierarchy of classes of an example application program in conjunction with which an embodiment of the invention can be implemented via integration of an audio or video program with the application program. The application program shown in FIG. 5 is specifically Outlook Express, version 5, available from Microsoft Corp.

For example, FIG. 5 shows the window class hierarchy 500 for an audio or video program that has been integrated with the application program Microsoft Outlook Express, version 5. The primary class 502, TW_WindowContext, provides a context for windows of the program that are being subclassed or hooked, and passes messages to the original window procedure. The class 504, TW_OE5SplashScreenContext, is for the splash screen of the program, which is an introductory screen displayed by the program after it is loaded and just before it starts. The class 506, TW_OEWindowContext, is the base class for all other of the program's classes, and provides basic services and information common to all these window classes of the program.

The class 508, TW_OE5MainWndContext, subclasses the window context class 506, and provides the toolbars and menus of the application program. The class 510, TW_OEEnvelopeWndContext, handles subclassing of the envelope window, which under version 5 of Outlook Express is a container window that encompasses the to, from, and subject fields. This class adjusts the size of the envelope window and its containing fields after the audio or video program has been inserted into the application program. The class 512, TW_OEMsgWndContext, handles generic message window subclassing, applies to windows that are opened when a user reads email, and provides generic services and information for all message types. These services can include reading the email, replying to the email, forwarding the email, creating a new email, and so on.

Finally, the class 514, TW_OESendMsgContext, is subclassed off the class 512, and is added by the audio or video program, not the application program 500. Thus, when an instance of the class 512 detects that a message composition window is being created and the audio or video program control(s) are being embedded into the window, the class 514 is also created. The message composition window may be created when a user composes a new message, replies to an existing message, forwards an existing message, and so on. The class 514 intercepts the message being sent, and uploads, in the case of an audio or video recorder program, recorded audio or video content to a streaming media server. On completion of the upload, the class 514 can modify the body of the message to include the uploaded streaming media content.

The class 514 more specifically can embed audio or video controls into the window created by the class 512, and provide for audio or video content such as recording, playback, and so on. Messages sent by the class 502 to the class 506 and then to the class 512 are intercepted by the class 514, so that proper functionality can be accomplished when the user performs a function within the class 512, such as sending the email, closing the window, and so on. For example, when the user sends the email, the class 514 is aware of the user having performed this function, and can perform its own functionality to ensure that the audio or video program integration with the application program is consistently and properly accomplished.

For application programs that do not provide a cogent set of classes that can be hooked or subclassed, a limited subclassing or hooking can be accomplished to allow for web-based integration of the audio or video program with these application programs. That is, buttons may be placed on the toolbars of such application programs that, when selected, open a web page of the audio or video program within a web browser. Such integration is referred to as loose integration, in that the only addition to the application program by the audio or video program is a web page link that opens up the web page of the audio or video program in which all other functionality of the audio or video program is performed by the user. By comparison, the integration otherwise described in this sub-section of the detailed description, as well as in the next subsection of the detailed description, is considered tight integration. This is because the audio or video program functionality is substantially performed by the user through the application program's window itself.

Audio or Video Program Integration with an Application Program: API's

In another embodiment of the invention, the audio or video program integration introduced with description of and reference to FIGS. 3 and 4 is particularly accomplished through API's of the application program. That is, integration is accomplished by employing a customization mechanism of the application program itself, exposed through a set of API's of the application program. An API is a language and message format used by the application program to communicate with the OS or other programs. API's can be implemented by writing function calls in the program, which provide the linkage to the required subroutine for execution.

For example, the Outlook 2000 application program, available from Microsoft Corp., allows for such customization by using forms. Functionality within this program is provided by a series of forms that can be customized. For instance, there is a form for creating a new email, for adding a new contact, for creating a new appointment in the calendar, and so on. Such standard forms can be customized by the audio or video program, to add audio or video controls of the audio or video program therein, and thus to integrate the audio or video program with this application program.

Customization of forms, or other customization mechanisms of application programs that may utilize API's, implicitly performs the method 300 of FIG. 3. Customization of a form, for instance, allows a priori presentation of the audio or video controls within a window. When the application program actually creates the window, such creation is inherently detected so that audio or video controls can be presented therein. That is, because the audio or video controls have already been inserted into the window via form customization, creation of the window automatically causes these controls to be presented in the window.

More specifically, in one embodiment, audio and/or video controls through which the user interacts can be added as ActiveX controls, or other types of controls, to Microsoft Outlook forms. An Active X control is a software module based on the Component Object Model (COM) architecture defined by Microsoft Corp. It enables a program to add functionality by calling ready-made components that blend in and appear as normal parts of the program. Specifically, ActiveX controls can be used to encapsulate the user interface of the audio and/or video controls within Microsoft Outlook.

COM interfaces to Microsoft Office application programs, such as Microsoft Outlook, may also be used. Such COM interfaces include the IDTExtensibility2 interface, defined as an API, and are a way to extend the Microsoft Office application programs. The COM interfaces provide the automatic connection for an application program via an external program-provided in-process Dynamic Link Library (DLL) through defined Registry values. As a result, the application program automatically runs this DLL when starting up, and invokes the predefined entry points. A DLL is an executable software module that performs some type of functionality. The Registry is a database of configuration settings used in versions of the Microsoft Windows operating system.

The object automation API's of Microsoft Outlook may be also used in conjunction with forms. Object automation allows access to Microsoft Outlook objects and events, so that email message processing may be altered. Objects include mail explorer windows, mail items, incoming and draft folders, mail forms, and so on. Events including mail being received, mail being sent, and so on.

Thus, an initial program may be loaded as a Microsoft Outlook add-in DLL, which in turn loads an extended form that includes ActiveX controls for user interaction. When a user creates an email, the extended form is shown, including the standard Microsoft Outlook controls, as well as the additional controls added by the external program for audio and/or video recording and/or playback functionality. Microsoft Outlook events are then trapped, and email messages modified upon their being sent. An email message is modified to directly include the audio and/or video as an inline component of HTML-based email, or a live link to the audio and/or video in text-based email, when the email message is sent. Microsoft Outlook mail creation form objects, such as buttons, input fields, message text, and so on, are additionally altered as necessary so that there is consistent behavior across the entire application.

Example

Email Program

Figure 6:
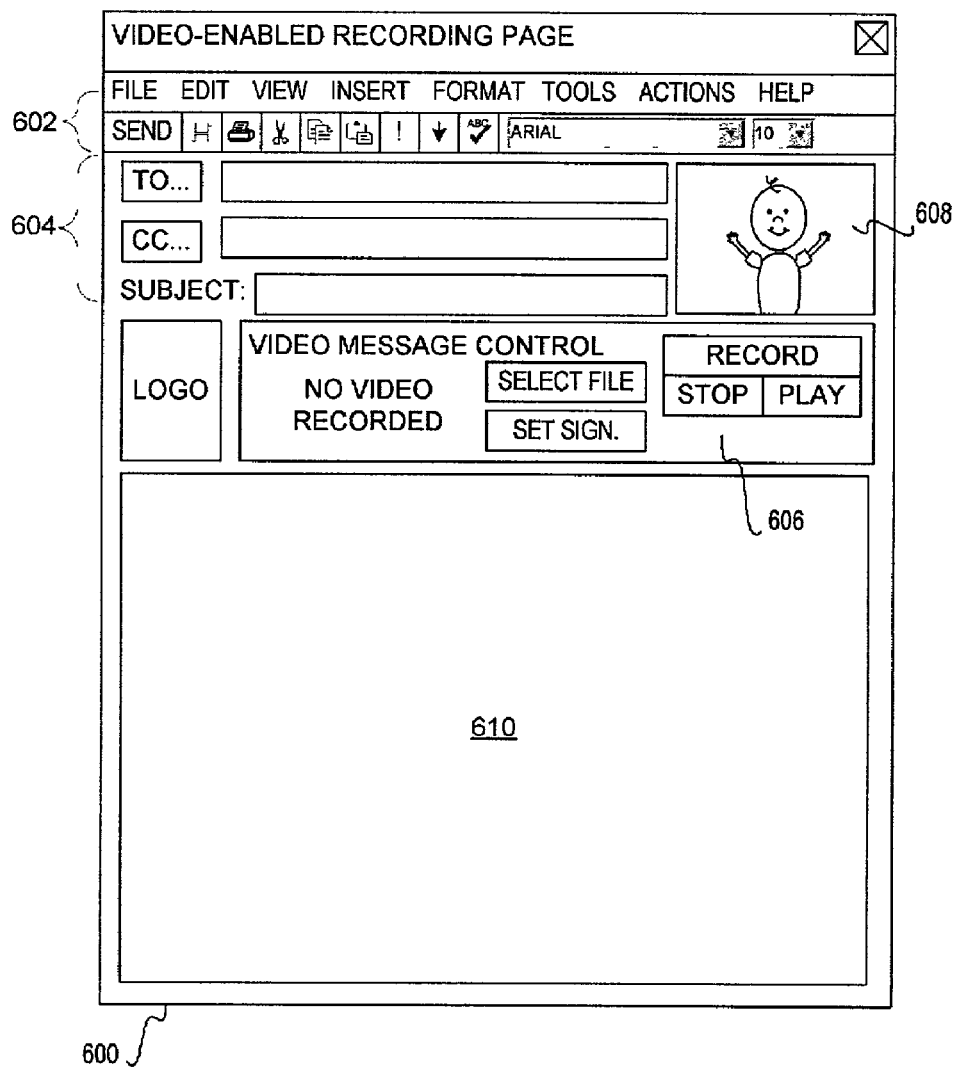
FIG. 6 is a diagram showing an example screenshot of how integration of an audio or video program with an application program may appear to the user, according to an example embodiment of the invention.

FIG. 6 shows an example screenshot of how integration of an audio or video program with an application program may appear to the user, according to an embodiment of the invention. The window 600 is created by the application program, and includes typical email functionality, such as menu items and toolbar buttons 602, to, cc, and subject lines 604, and a message text entry area 610. However, when the window 600 was created, the audio or video program presented audio or video controls 606 into the window 600, as well as a video viewing area 608, such that the application program is not aware of this added functionality. Therefore, the user interacts with the audio or video program as if it were part of the application program, even though the audio or video program is separate or external to the application program.

The audio or video program's integration with the application program as shown in FIG. 6 may have a number of different attributes. The integration may be such that the audio or video controls are presented in windows designed to display received email, and not just those designed to send new email. The audio or video controls may be integrated directly into the windows of the application program, such that a user is able to store and manage email messages that include audio or video content. The audio or video controls are further integrated so that a user can send new messages that include audio or video content, reply to messages with or having audio or video content, forward messages along with newly recorded audio or video content, and so on.

The audio or video program itself may be deployed as a plug-in or add-on to an existing application program. A plug-in is an auxiliary program that works with another software program to enhance its capability. Furthermore, the audio or video program that is integrated into an email program particularly need not deliver the audio or video content as an email attachment. Instead, the email may include a Universal Resource Locator (URL) address to a web page on the Internet on which the audio or video content plays back in a streaming or non-streaming manner. Alternatively, a streaming or non-streaming player may be included in the email if the email is formatted using a markup language such as HyperText Markup Language (HTML), or another rich format.

Such functionality is provided by modifying the behavior of the email program, such as by modifying the output of the email program. For instance, when an email message is sent by the email program, the audio or video program may intercept the message, and modify the message so that the audio or video content is integrated within the message in some manner. In such an example, integration is accomplished on two levels: the initial integration of the audio or video program into the email program, via the controls of the former being presented within the latter, and subsequent integration of the audio or video program via behavior modification of the email program.

CONCLUSION

It is noted that, although specific embodiments have been illustrated and described herein, it will be appreciated by those of ordinary skill in the art that any arrangement is calculated to achieve the same purpose may be substituted for the specific embodiments shown. This application is intended to cover any adaptations or variations of the present invention. Therefore, it is manifestly intended that this invention be limited only by the claims and equivalents thereof.

The invention claimed is:

1. A system for integrating an audio or video program with an application program comprising:
   hardware including a processor;
   an operating system;
   the application program running on the operating system; and,
   the audio or video program running on the operating system, the audio or video program separate from but integrated with the application program such that the application program is unaware that the audio or video program has been integrated therewith,
   wherein a user of the application program directly interacts with the application program, and the user interacts with the audio or video program as though the audio or video program were part of the application program,
   wherein the processor executes the operating system, the application program, and the audio or video program,
   wherein the audio or video program is further integrated with the application program by subclassing into a window of the application program such that the audio or video program detects when an event related to the application program occurs.

2. The system of claim 1, wherein the audio or video program modifies contents of a window of the application program created through the operating system.

3. The system of claim 1, wherein the audio or video program runs in a window created through the operating system and related to a window of the application program created through the operating system.

4. The system of claim 1, wherein the application program comprises one of: an email program, a presentation program, a publishing program, a word processing program, a spreadsheet program, an instant messaging program, a telephony program, and a gaming program.

5. The system of claim 1, wherein the audio or video program comprises one of: an audio or video player program, an audio or video recorder program, an audio or video player-and-recorder program.

6. The system of claim 1, wherein the audio or video program comprises one of: an audio-only program, a video-only program, and an audio-and-video program.

* * * * *